(12) United States Patent
Miniscalco et al.

(10) Patent No.: US 9,680,565 B2
(45) Date of Patent: Jun. 13, 2017

(54) FREE-SPACE OPTICAL NETWORK WITH AGILE BEAM-BASED PROTECTION SWITCHING

(71) Applicant: Raytheon Company, Waltham, MA (US)

(72) Inventors: William J. Miniscalco, Sudbury, MA (US); Irl W. Smith, Concord, MA (US)

(73) Assignee: RAYTHEON COMPANY, Waltham, MA (US)

( * ) Notice: Subject to any disclaimer, the term of this patent is extended or adjusted under 35 U.S.C. 154(b) by 116 days.

(21) Appl. No.: 13/841,307

(22) Filed: Mar. 15, 2013

(65) Prior Publication Data

US 2014/0270749 A1    Sep. 18, 2014

(51) Int. Cl.
*H04B 10/00* (2013.01)
*H04B 10/038* (2013.01)
*H04B 10/11* (2013.01)
*H04B 10/118* (2013.01)

(52) U.S. Cl.
CPC .......... *H04B 10/038* (2013.01); *H04B 10/11* (2013.01); *H04B 10/118* (2013.01)

(58) Field of Classification Search
CPC . H04B 10/112; H04B 10/118; H04B 10/1125; H04B 10/038; H04B 10/07; H04B 10/11
See application file for complete search history.

(56) References Cited

U.S. PATENT DOCUMENTS

| 8,116,632 | B2 | 2/2012 | Miniscalco et al. | |
|---|---|---|---|---|
| 2002/0004843 | A1* | 1/2002 | Andersson et al. | 709/238 |
| 2002/0149811 | A1* | 10/2002 | Willebrand | 359/110 |
| 2007/0031151 | A1 | 2/2007 | Cunningham et al. | |
| 2008/0112312 | A1* | 5/2008 | Hermsmeyer et al. | 370/228 |
| 2009/0214216 | A1* | 8/2009 | Miniscalco et al. | 398/89 |
| 2011/0243074 | A1* | 10/2011 | Shin | H04B 10/803 370/329 |

FOREIGN PATENT DOCUMENTS

WO    WO 2009/070340 A1    6/2009

OTHER PUBLICATIONS

Miniscalco et al., "Coherent Beam Combining and Optical Space-Time Division Multiple Access", 2010, SPIE vol. 7814, 78140S, pp. 1-10.*

(Continued)

*Primary Examiner* — Ken N Vanderpuye
*Assistant Examiner* — David Lambert (57) ABSTRACT

A system includes a network having multiple network nodes each configured for free-space optical communication. Each network node includes one or more apertures through which optical beams are transmitted and received over optical links. The optical links include (i) a traffic link that transports higher-rate traffic between nodes and (ii) an acquisition/tracking link that transports lower-rate signals used to establish and maintain location knowledge of other nodes. Each network node also includes a network processor configured to determine one or more backup paths through the network. Each network node further includes a beam steering unit configured to redirect an optical beam from the traffic link onto the acquisition/tracking link to create a backup traffic link.

21 Claims, 8 Drawing Sheets

(56) References Cited

OTHER PUBLICATIONS

International Search Report dated Jun. 26, 2014 in connection with International Patent Application No. PCT/US2014/016460, 5 pages.
Written Opinion of International Searching Authority dated Jun. 26, 2014 in connection with International Patent Application No. PCT/US2014/016460, 6 pages.
Vincent W.S. Chan; "Optical Space Communications"; IEEE Journal on Selected Topics in Quantum Electronics, vol. 6, No. 6; Nov. 1, 2000; pp. 959-975.
Miniscalco, et al.; "Coherent Beam Combining and Optical Space-Time Division Multiple Access"; Free-Space Laser Communications X; 2010; 10 pages.
Miniscalco, et al.; "10 Gb/s Ethernet Laser Communications Using Optical Space-Time Division Multiple Access"; The 2010 Military Communications Conference—Unclassified Program—Systems Perspectives Track; 2010; pp. 1607-1612.
William J. Miniscalco; "Optical Space-Time Division Multiple Access"; Journal of Lightwave Technology, vol. 30 No. 11; Jun. 1, 2012; pp. 1771-1785.

\* cited by examiner

FREE-SPACE OPTICAL NETWORK WITH AGILE BEAM-BASED PROTECTION SWITCHING

TECHNICAL FIELD

This disclosure is directed generally to optical communication systems. More specifically, this disclosure relates to a free-space optical network with agile beam-based protection switching.

BACKGROUND

Free-space optical (FSO) systems include network nodes that communicate with one another optically using beams of light. FSO systems can provide much higher data rates than radio frequency (RF) communication systems. FSO systems are also often free from spectrum usage restrictions associated with RF systems. In addition, FSO systems typically offer a lower probability of detection and higher jam resistance than RF systems. However, when used in the atmosphere, FSO systems are susceptible to blockage by clouds, fog, and other obstructions, and FSO systems can suffer from deep fades even in clear atmosphere due to turbulence.

Conventional solutions to these problems include mitigation techniques at the optical link level, hybrid RF/optical links, and network-based protection approaches. Link mitigation techniques typically involve features such as adaptive optics, forward error correction, interleaving, and optical automatic gain control. However, even with these mitigation techniques, FSO systems often have difficulty providing acceptable performance even in clear air. Hybrid RF/optical links fall back on RF communications when optical communications fail, but RF links have significantly less range and throughput than optical links, thereby reducing system throughput. Link-based mitigation has been augmented with network-based approaches, which typically rely on large buffers, retransmissions once optical links are restored, and the establishment of new optical links using mechanical beam steering. Unfortunately, these techniques typically introduce large latencies and have limited scalability to large networks. In addition, cost along with size, weight, and power (SWaP) considerations restrict the number of optical terminals (and therefore the number of optical links) that can be used at a network node, particularly for moving platforms such as aircraft and ground vehicles. This typically makes maintaining backup paths impractical when using mechanical beam steering.

SUMMARY

This disclosure provides for a free-space optical network with agile beam-based protection switching. Among other things, this approach can support a network-based mitigation technique for failed communication links that overcomes one, some, or all of the problems noted above. This approach may also be used in conjunction with link-based mitigation techniques, such as those described above.

In a first embodiment, a system includes a network having multiple network nodes each configured for free-space optical communication. Each network node includes one or more apertures through which optical beams are transmitted and received over optical links. The optical links include (i) a traffic link that transports higher-rate traffic between nodes and (ii) an acquisition/tracking link that transports lower-rate signals used to establish and maintain location knowledge of other nodes. Each network node also includes a network processor configured to determine one or more backup paths through the network. Each network node further includes a beam steering unit configured to redirect an optical beam from the traffic link onto the acquisition/tracking link to create a backup traffic link.

In a second embodiment, an apparatus includes an optical communication terminal configured to engage in free-space optical communication with network nodes. The optical communication terminal includes one or more apertures through which optical beams are transmitted and received over optical links, where the optical links include (i) a traffic link that transports higher-rate traffic and (ii) an acquisition/tracking link that transports lower-rate signals used to establish and maintain location knowledge of the network nodes. The apparatus also includes a network processor configured to determine one or more backup paths through a network. In addition, the apparatus includes a beam steering unit configured to redirect an optical beam from the traffic link onto the acquisition/tracking link to create a backup traffic link.

In a third embodiment, a method includes communicating optically at a first network node with a second network node and exchanging data with the second network node by transmitting and receiving first optical beams over an optical traffic link. The method also includes optically tracking a third network node at the first network node by transmitting and receiving second optical beams over an optical acquisition/tracking link. The method further includes determining one or more backup paths through a network. In addition, the method includes redirecting the first optical beams from the traffic link onto the acquisition/tracking link to create a backup traffic link.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
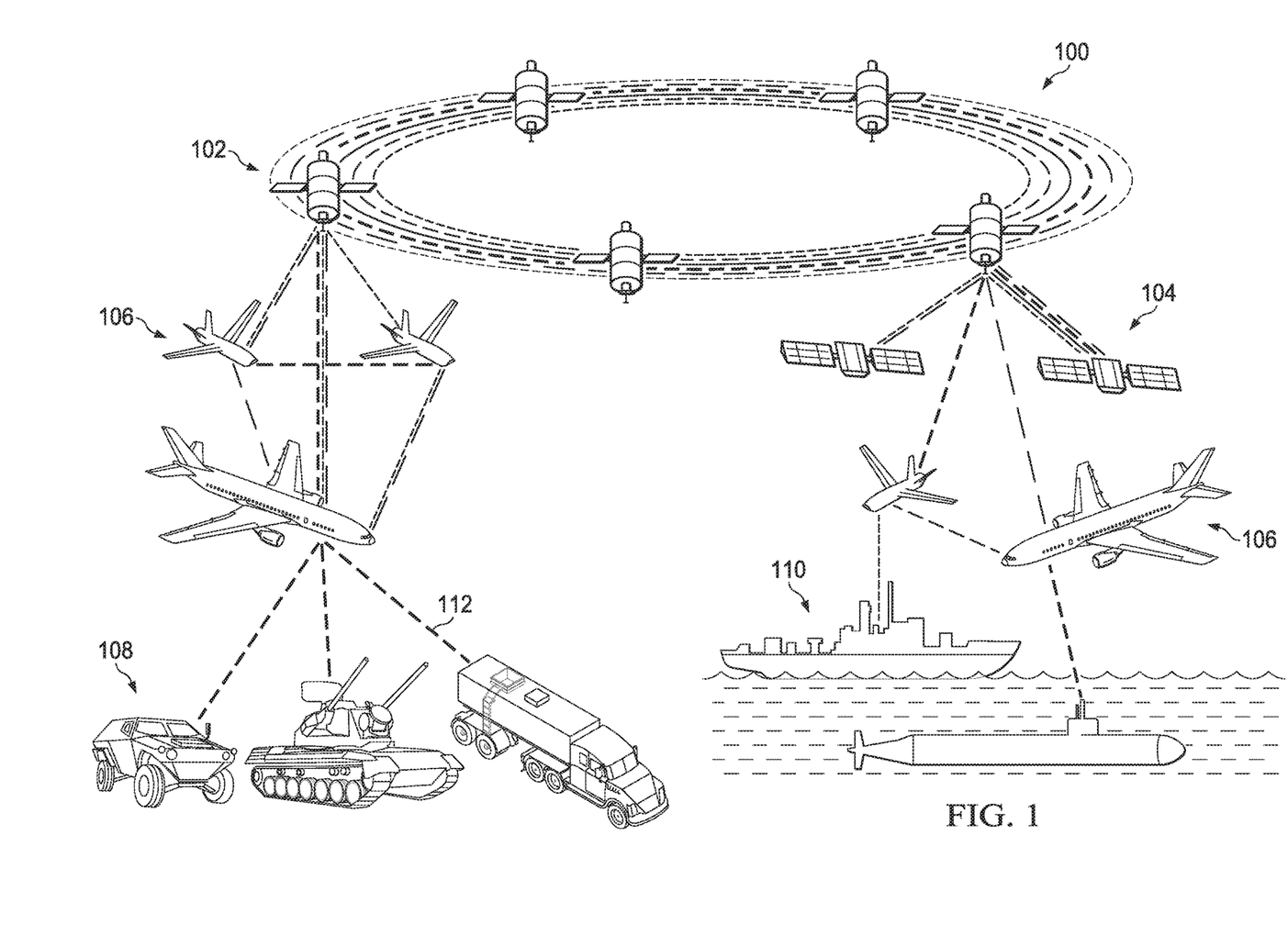
FIG. 1 illustrates an example free-space optical (FSO) communication network in accordance with this disclosure.

FIG. 1 illustrates an example free-space optical (FSO) communication network 100 in accordance with this disclosure. As shown in FIG. 1, the network 100 includes various nodes that communicate with one another optically. In this example, the nodes include satellites 102-104, aerial vehicles 106, land-based vehicles 108, and sea-based vehicles 110. Each satellite 102 includes any suitable structure in geostationary orbit around Earth. Each satellite 104 includes any suitable structure in low-earth and medium-earth orbit. Each aerial vehicle 106 includes any suitable structure capable of remaining airborne for a period of time, such as a manned aircraft or an unmanned aerial vehicle (UAV). Each land-based vehicle 108 includes any suitable structure capable of traveling on land, such as a tank, personnel carrier, or armored vehicle. Each sea-based vehicle 110 includes any suitable structure capable of traveling on or under water, such as a ship or submarine.

As shown in FIG. 1, various communication links 112 exist between the nodes 102-110 of the network 100. These communication links 112 include optical communication links allowing the nodes 102-110 to communicate with one another optically. These communication links 112 may also include radio frequency (RF), microwave, or other non-optical electromagnetic communication links allowing the nodes 102-110 to communicate with one another using non-optical electromagnetic waves. For brevity, all non-optical electromagnetic communication links are referred to as RF links. The communication links 112 could support data transfer at any suitable rate(s).

In accordance with this disclosure, the nodes 102-110 support the use of spatially-agile FSO beams combined with an RF mesh network for nodes within RF communication range of one another. Spatial agility means that an FSO beam can be repointed from one direction to another direction rapidly (such as in less than about 0.5 seconds or less) without sweeping out the path connecting the two directions. In addition to the behavior of a beam being transmitted from an optical aperture, spatial agility also applies to the direction from which an optical aperture can receive an incoming beam. Optical terminals in the nodes 102-110 use optical phased arrays (OPAs) or other suitable elements to electronically control their transmit beam and receive beam directions. This allows the nodes 102-110 to point and repoint their optical communications in order to send and receive data optically in different directions. When communication with one node degrades or is interrupted, transmit beam and receive beam directions can be changed rapidly (such as in a fraction of a second) to allow communications with another node. This allows the nodes 102-110 to reroute traffic around degrading or interrupted communication links 112 very rapidly, reducing communication dead time and lost data significantly. In some embodiments, traffic can be rerouted around a single faulty communication link in about 10 ms or even less, which is much faster than conventional systems that use mechanical steering to reposition light beams. This provides "protection switching" in the FSO network 100. Protection switching refers to a network function where a node switches over from a first communication path to a second communication path in response to some condition, such as a fault in the first communication path.

Although FIG. 1 illustrates one example of an FSO communication network 100, various changes may be made to FIG. 1. For example, the network 100 need not include all types of nodes 102-110 shown in FIG. 1. Optical communications that use agile beam steering to support protection switching could be used with any suitable type(s) of nodes. As a particular example, optical communications could occur between only aerial vehicles or between only aerial and ground-based or sea-based vehicles. Any single node type or combination of multiple node types could use this functionality.

Figure 2A:
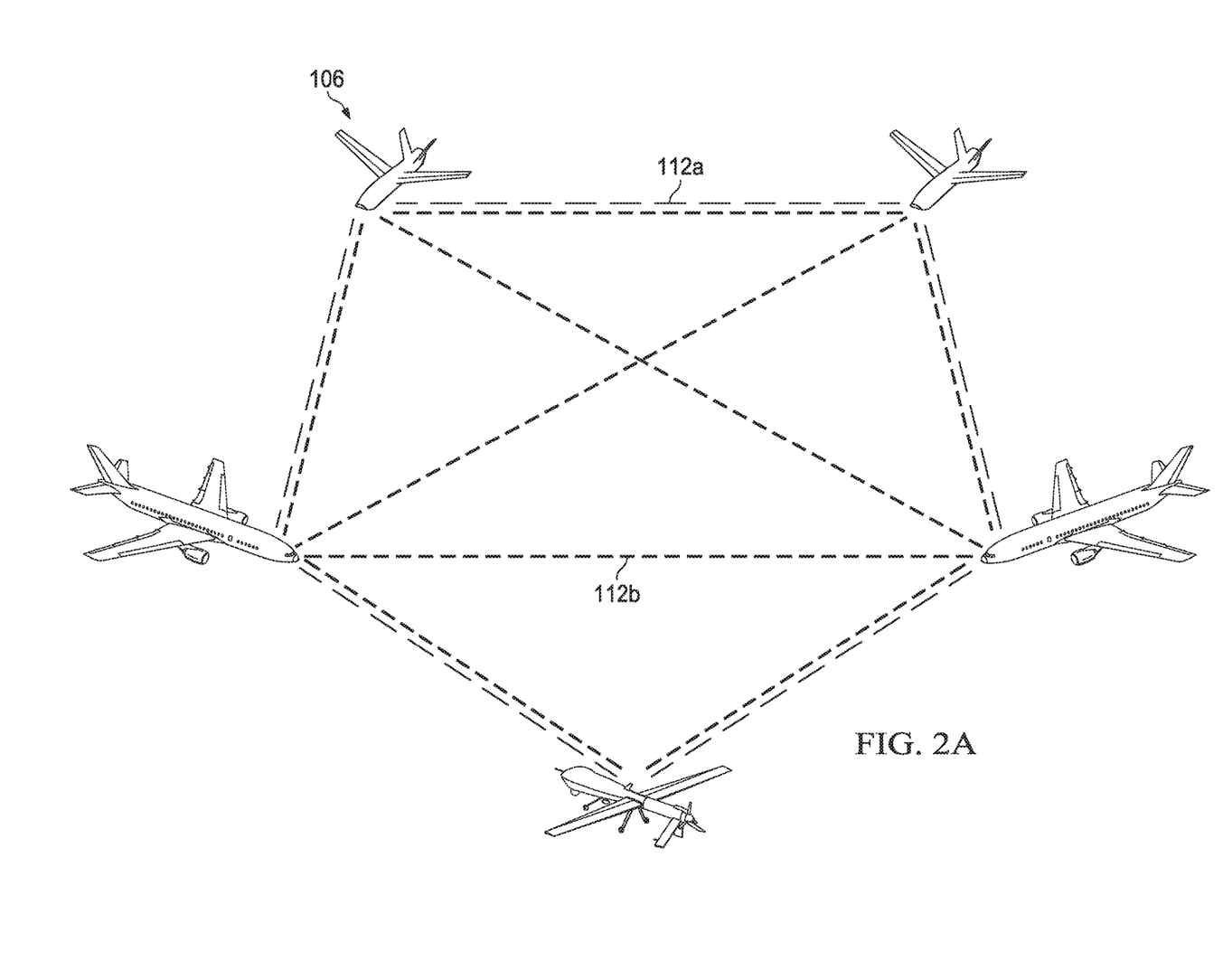
FIG. 2A illustrates example communication paths in an FSO network and FIG. 2B illustrates example communication paths in an associated radio frequency/microwave network in accordance with this disclosure.
Figure 2B:
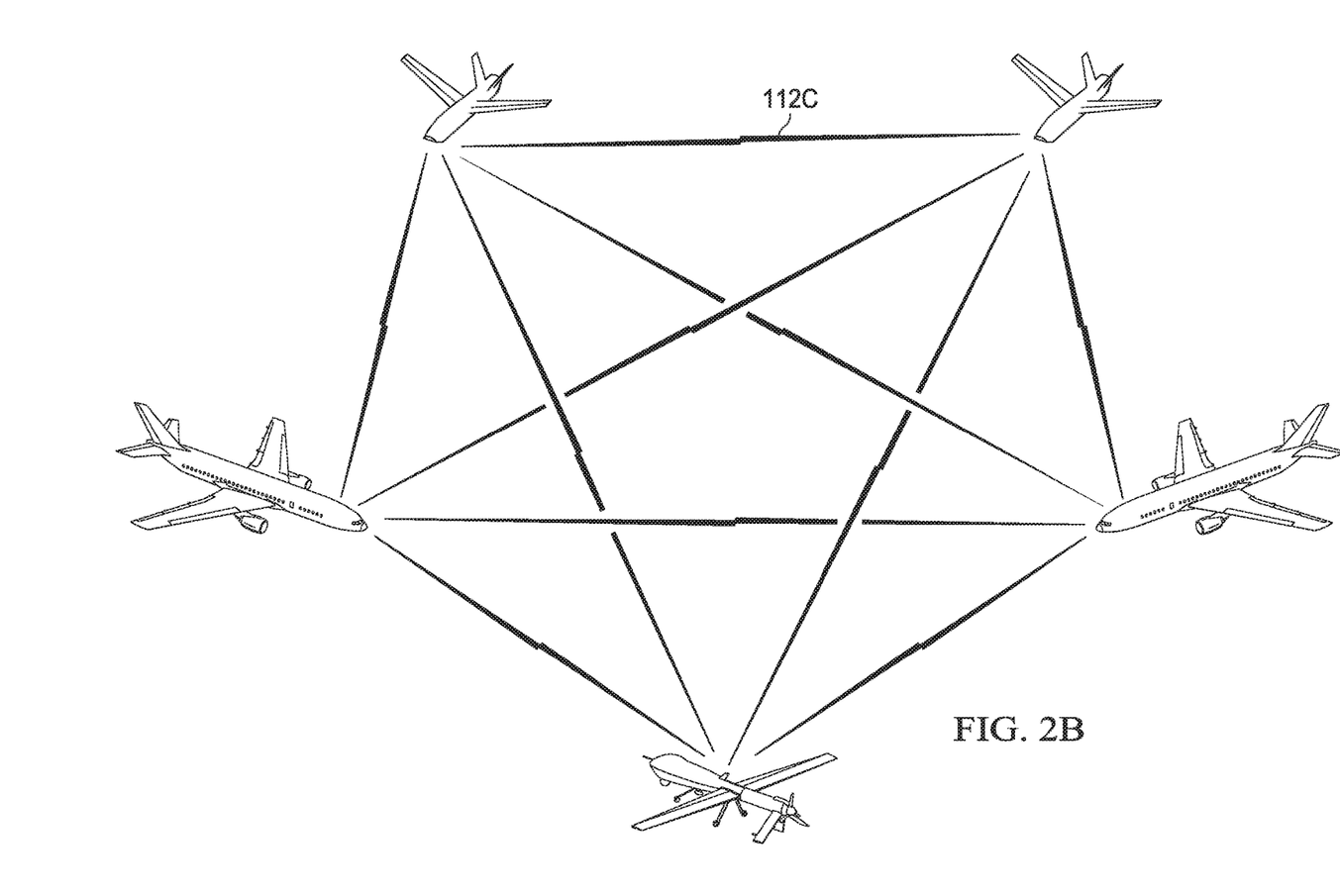

FIG. 2A illustrates example communication paths in an FSO network, and FIG. 2B illustrates example communication paths in an associated RF/microwave network in accordance with this disclosure. In particular, FIGS. 2A and 2B illustrate example communication paths in a network that includes multiple aerial vehicles 106. Of course, the network shown in FIGS. 2A and 2B could include other or additional type(s) of nodes as illustrated in FIG. 1.

FIG. 2A illustrates an example of an optical communication network formed by optical traffic links 112a and optical tracking links 112b between multiple aircraft (nodes 106). Optical communication rates between nodes could reach 1 Gbps, 10 Gbps, or even higher. As shown in FIG. 2B, RF communication links 112c between the nodes 106 constitute a parallel or overlay network utilizing the same nodes 106. The overlay network can be used to transport information at lower data rates related to the optical communication network (such as control plane data), to transport certain data when optical communication links fail, or to transport data intended only to be carried on the RF network. The RF network can be a system specifically intended to support the FSO network or a network originally intended to provide RF communications as a separate system.

In particular embodiments, primary optical data communications over a traffic link 112a involving a node 102-110 occur using a communication aperture in that node, while possible alternative optical communication links are identified and maintained using smaller and less costly acquisition/tracking apertures in that node. These acquisition/tracking apertures maintain optical tracking links 112b with neighboring nodes. The acquisition/tracking apertures support the identification of potential backup optical links that can be used in the event that the primary optical link used by the communication aperture degrades or is interrupted. If degradation or interruption of the primary optical link occurs, electronic beam steering is used to redirect the communication aperture to an alternative node being tracked using the acquisition/tracking apertures so that a backup optical link is quickly established. The acquisition/tracking apertures can be less complex than the communication aperture, so the acquisition/tracking apertures can have a lower cost and size, weight, and power (SWaP) characteristics than the communication aperture. The acquisition/tracking apertures can also provide information on the quality of potential communication links for input to route computation algorithms. As described below, however, a single communication aperture can be used to support both the communication of data over the primary optical link as well as the identification of potential backup optical links.

As shown in FIGS. 2A and 2B, there are multiple types of optical links 112 between the nodes 106. In FIG. 2A, the optical links include traffic links 112a and tracking links 112b. Before a traffic link 112a can be established, a tracking link 112b can exist to maintain precise pointing directions between two nodes. The collection of links 112a-112b and the nodes 106 form an FSO network, which is a subnetwork of a larger communications system. In this FSO network, optical phased array (OPA) steering can be used for fast, agile beam repointing. The traffic links 112a transport high-rate data over optical connections and represent the optical paths for exchanging data between nodes. The tracking links 112b represent paths that could potentially be converted into communication links should an existing communication link degrade or be lost. In some embodiments, each node in an FSO network includes at least one optical terminal. In particular embodiments, each optical terminal could support one traffic link 112a and multiple tracking links 112b at any instance in time. As described below, it is also possible to establish backup communication links to nodes that are not currently being tracked using the links 112b.

As shown in FIG. 2B, various RF links 112c may also exist between the same nodes 106 that are part of the FSO network. The links 112c represent RF, microwave, or other wireless communications between nodes. The links 112c and the nodes 106 form an RF subnetwork of the same larger communication system. In particular embodiments, RF phased arrays can be used to generate multiple beams per aperture or for agile steering to hop beams between multiple nodes in order to form a mesh network for all nodes within range of one another. The RF subnetwork could be used as a control plane for carrying optical link state information, such as the status of existing traffic links 112a, the expected performance of potential backup links as monitored by tracking links 112b, and location and status information for nodes within RF range that are not being tracked optically via any links 112b. The RF subnetwork could also be used by nodes without optical connections to maintain contact with one another. In some embodiments, the RF subnetwork may be implemented specifically to support the FSO network. In other embodiments, the RF subnetwork may be an existing RF network or other network whose primary purpose is to carry RF communication traffic.

Figure 3:
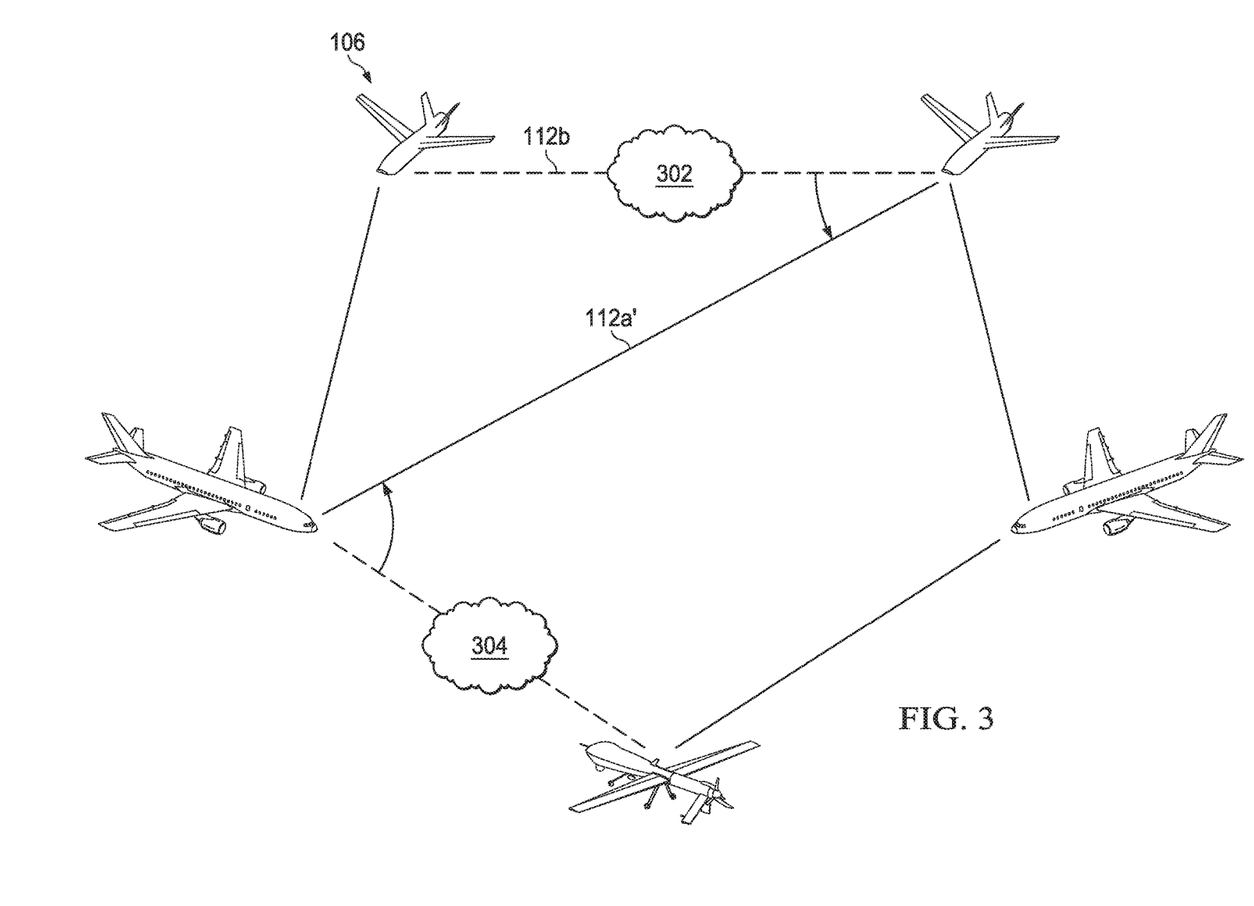
FIG. 3 illustrates an example of protection switching in an FSO network in accordance with this disclosure.

FIG. 3 illustrates an example of protection switching in an FSO network in accordance with this disclosure. In the network shown in FIGS. 2A and 2B, each node includes at least one primary path (traffic link 112a) and at least one potential backup path being monitored (tracking links 112b). If a fault is detected on a traffic link 112a, the communication aperture of a node can be reconfigured using electronic steering to establish a new traffic link 112a over a path being monitored by a tracking link 112b. Since the nodes connected by the tracking link 112b are able to maintain their relative position (pointing direction) and the condition of the path between them in real time, the repointing of their communication apertures towards each other and the establishment of an active traffic link between them can occur very quickly.

An example of this is shown in FIG. 3, where two obstructions 302-304 have interfered with or broken two active traffic links 112a between various nodes. As a result, the affected nodes establish new traffic links using one or more alternative paths being monitored by their tracking links 112b. In this example, the outage caused by the blockage of the two traffic links 112a can be repaired by establishing a single new traffic link 112a', effectively converting what was a ring network into a linear network. However, this is not necessarily the case, and multiple blockages may often require more complicated redirections of beams to establish multiple backup links. In general, any suitable number of backup traffic links 112a' can be established along the paths being monitored by the tracking links 112b in order to maintain communications between nodes in an FSO network.

In some embodiments, dedicated acquisition/tracking apertures can be used in the nodes to continuously track and provide beacons or other signals to other nodes for the purposes of spatially acquiring or locating other nodes and subsequently maintaining tracking links 112b between those nodes. This can occur even when no traffic link 112a has been established between those nodes. Since an optical tracker may require a beacon or other signal to track (which can be at a communication wavelength), the nodes at both ends of a tracking link 112b are mutually aware, meaning both nodes can point their beacons at each other and maintain precise relative position at the same time.

In other embodiments, the tracking functionality uses the communication aperture, and no dedicated acquisition/tracking apertures are needed. In these embodiments, tracking data can be updated by momentarily hopping the transmit and receive directions of the communication aperture between the node with which a traffic link 112a is being maintained and those nodes being tracked for potential backup optical links 112b. This may involve very fast beam repointing in order to maintain high information throughput on the traffic link 112a. It may also involve temporal coordination so that the beacon source and the beacon receiver are aimed at each other at the appropriate time.

As noted above, the RF subnetwork can be used to transmit control plane information between nodes. The control plane information can include a wide variety of information depending on the implementation. For example, the control plane information can include information for spatially and temporally coordinating transient reciprocal beam pointing between nodes, meaning information that allows the nodes to repoint their optical systems at one another and exchange beacon signals or other signals. This information can be used to preplan backup routes for active optical paths through the network. Because the optical state of potential links changes continuously, protection path calculations can be performed continuously. The RF subnetwork can also be used to transport a limited amount of priority traffic if optical traffic links 112a are not available. The RF subnetwork can further be used to transport performance information about links 112a-112b being monitored and to provide status information about nodes without tracking links 112b so that tracking links 112b can be rapidly established if needed. In particular embodiments, the nodes include RF phased array antennas to generate/receive multiple beams or to hop a single beam among multiple nodes. This provides for efficient usage of RF terminal hardware and a larger number of simultaneous RF links. In other embodiments, mechanically-steered RF directional antennas can be used. In still other embodiments, omni-directional RF antennas can be used.

In particular embodiments, a node could operate as follows to handle a dropout in a traffic link 112a:

(1) Nodes exchange information about usage and spare capacity on their traffic links 112a via their existing optical connections on links 112a-112b and via their RF links 112c. A first set of plans for rerouting traffic for blocked links can be calculated for the case of using only spare capacity on existing traffic links 112a. This is a network operation because an end-to-end path is found for the blocked traffic. To support this, nodes can exchange information and converge on the backup paths prior to any outage (such as in a manner similar to the operation of IP routing protocols).

(2) If suitable backup paths cannot be found for a potential failure of one or more primary links 112a using spare capacity on the existing traffic links 112a, a second set of plans for backup traffic paths are calculated based on information from existing tracking links 112b connecting nodes without a traffic link 112a. This control plane information can be provided either directly on the optical connections or by the RF subnetwork.

(3) If no suitable backup paths can be found over paths with existing tracking links 112b, a third set of plans are calculated incorporating nodes that are only connected using RF links 112c. This third set of plans may require one or more nodes to redirect their tracking links 112b to other nodes until a network-wide backup plan can be established that corresponds to the second set of plans discussed in step (2) above. The location and state of nodes not connected by tracking links 112b can be provided by the RF subnetwork, which includes nodes that have no or limited optical connections at that instance in time.

(4) Short dropouts (such as less than 0.1 seconds) can be ignored for protection switching purposes. Link-level mitigation can compensate for some or all of this type of dropout. End users can either ignore the loss of data or retransmit lost data.

(5) For dropouts of intermediate duration (such as from 0.1 seconds to 1 second), traffic can be rerouted using spare capacity on existing traffic links 112a as planned in step (1) above. If spare capacity is insufficient but backup paths exist, lower priority traffic can be discarded, and higher priority traffic can utilize the available spare capacity. If no backup paths exist for some links, the process can move to step (6).

(6) For long dropouts exceeding a set duration (such as 1 second) or for intermediate dropouts with no existing backup paths, traffic links can be redirected onto new paths as determined in step (2) or step (3) above. While the plans of step (3) may be needed in extreme circumstances, it may be that the continuous recalculation of backup paths will allow for the use of the second set of plans from step (2) rather than the third set of plans from step (3). Ideally, the use of backup traffic paths on existing tracking links 112b and the switching of traffic links 112a can occur quickly with minimal loss of data.

Although FIGS. 2A and 2B illustrate examples of communication paths in an FSO network, various changes may be made to FIGS. 2A and 2B. For example, an FSO network could include any number and type(s) of nodes in any suitable configuration. Also, the links 112a-112c between the nodes can vary and may constantly change depending on various factors, such as environment conditions, physical obstructions, traffic conditions, and node positions. Although FIG. 3 illustrates one example of protection switching in an FSO network, various changes may be made to FIG. 3. Again, an FSO network could include any number and type(s) of nodes in any suitable configuration. In addition, link outages may occur at any location(s) and in any combination in a network, necessitating different reconfigurations of the traffic links than shown. Moreover, blockage of an optical path, whether for a traffic link 112a or a tracking link 112b, may trigger a reconfiguration of one or more tracking links 112b in addition to any changes in the traffic links 112a.

Figure 4:
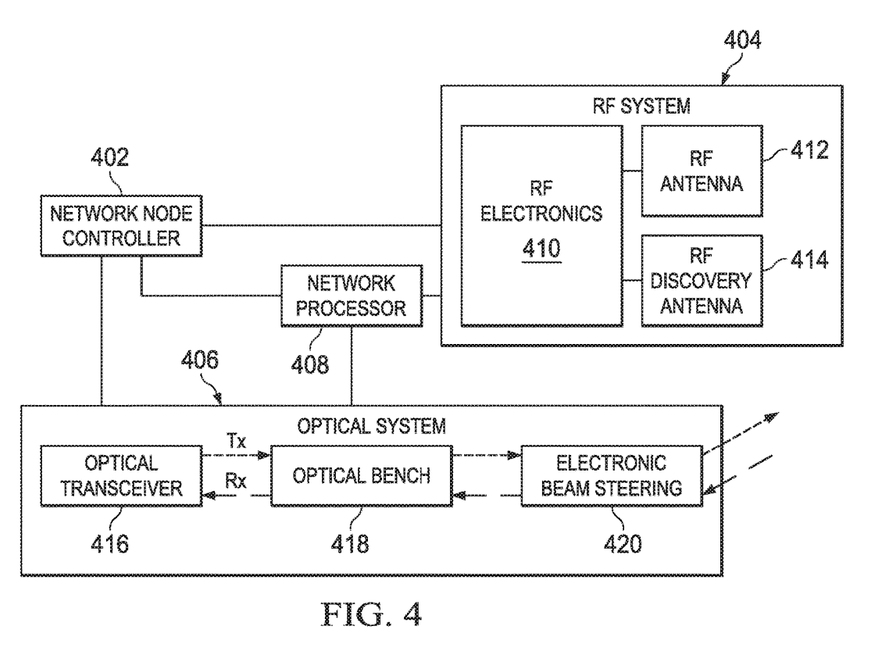
FIG. 4 illustrates an example network node with both FSO and RF/microwave capabilities in accordance with this disclosure.

FIG. 4 illustrates an example network node with both FSO and RF/microwave capabilities in accordance with this disclosure. In particular, FIG. 4 illustrates an example hybrid "optical plus RF" optical terminal 400 that may be located at a network node of an FSO network. The terminal 400 here could be used in any of the nodes 102-110 in the FSO network 100 of FIG. 1. The terminal 400 could also be used in any other suitable node or in any other suitable system.

As shown in FIG. 4, the terminal 400 includes a network node controller 402, an RF system or terminal 404, one or more optical systems or terminals 406, and a network processor 408. The controller 402 controls the overall operation of the node, including the operations of the terminals 404-406 that are located at the node. For example, the controller 402 could control the RF terminal 404 and the optical terminal 406 to control the transmission or reception of data by the terminal 400. The controller 402 is responsible for functions such as startup and shutdown of terminals, monitoring and reporting of terminal and link status, configuring the terminals, and executing the primary and backup routing plans calculated and stored in the network processor 408 when instructed by the network processor 408. The controller 402 includes any suitable structure for controlling a communication terminal, such as a processing system that includes at least one microprocessor, microcontroller, digital signal processor, field programmable gate array, or application specific integrated circuit.

The network processor 408 operates to maintain the topology of a network and the states of the nodes and links. The network processor 408 also participates in the distributed calculation of backup routes and stores the results. The calculation of backup routes could represent a distributed process performed amongst multiple nodes 400 using collaboration and information exchange amongst the nodes. The network processor 408 further decides on the mitigation procedure to be implemented in case of an outage (which may be local or remote). In addition, the network processor 408 distributes traffic between the RF terminal 404 and the one or more optical terminals 406 that may be located at that node. The processor 408 includes any suitable structure for supporting network organization, such as a processing system that includes at least one microprocessor, microcontroller, digital signal processor, field programmable gate array, or application specific integrated circuit.

The RF terminal 404 provides communication with other nodes using RF communications over the links 112c. The RF terminal 404 may be specifically designed to support the operation of an FSO network, or it may also be part of an RF communication network that is used to incidentally provide support to the FSO network. In this example, the RF terminal 404 includes RF electronics 410, an RF antenna 412, and a discovery antenna 414. The RF electronics 410 perform various functions for generating signals for wireless transmission or for processing signals received wirelessly. As particular examples, the RF electronics 410 could include filters, amplifiers, mixers, modems, or other components used to generate and receive RF signals. Other functions could also be supported, such as signal combining to combat multipath fading or to support the use of phased array antennas. The RF electronics 410 could further include mobile ad hoc network (MANET) and Common Data Link (CDL) functionality, which supports the exchange of data with multiple other nodes. The RF electronics 410 include any suitable structure facilitating communication with other nodes using RF or other wireless electromagnetic signals.

The RF antenna 412 and the discovery antenna 414 support the transmission and receipt of RF signals to and from other nodes. In some embodiments, the RF antenna 412 is used to communicate with other nodes and exchange data, such as control plane information, and the discovery antenna 414 is used to locate and identify new nodes that come into RF range of the antenna 414 for the purpose of establishing RF communications. The RF antenna 412 includes any suitable structure for communicating data to and from other nodes, such as a phased array antenna. The discovery antenna 414 includes any suitable structure for receiving signals from new nodes, such as an omnidirectional radiator structure. Note that the use of antennas such as phased array antennas can support other functions, such as beam forming to simultaneously transmit a plurality of RF beams in different directions.

The optical terminal 406 provides communication with other nodes using optical communications over the links 112a-112b. In this example, the optical system 406 includes an optical transceiver 416, an optical bench 418, and an electronic beam steering assembly 420. The optical transceiver 416 generally operates to convert data into optical signals for transmission and to convert received optical signals into data for further processing. The optical transceiver 416 includes any suitable structure for converting data to and from optical signals, such as an optical modem. Note that while an integrated optical transceiver is shown here, the optical transceiver 416 could be implemented using an optical transmitter and a separate optical receiver.

The optical bench 418 performs various functions to process the optical beams sent to and from the optical transceiver 416. For example, the optical bench 418 could include components for collimating light and directing the light towards the electronic beam steering assembly 420. The optical bench 418 could also include components for performing tracking functions related to the acquisition/tracking links 112b. The optical bench 418 includes any suitable structure for altering optical beams sent to and from an optical transceiver. Example embodiments of the optical bench 418 are shown in FIGS. 5A and 5B, which is described below.

The electronic beam steering assembly 420 is configured to steer an outgoing transmit beam and an incoming receive beam. The electronic beam steering assembly 420 can therefore change the transmit beam direction and the receive beam direction. The transmit beam direction represents the direction in which an outgoing beam is transmitted away from the terminal 400. The receive beam direction represents the direction from which an incoming beam is received at the terminal 400. The electronic beam steering assembly 420 includes any suitable structure for directing and redirecting incoming and outgoing optical beams, such as one or more optical phased arrays and one or more diffraction gratings. Possible designs for the electronic beam steering assembly are provided in U.S. Pat. No. 7,215,472; U.S. Pat. No. 7,428,100; and U.S. Patent Publication No. 2012/0081621 (which are hereby incorporated by reference). Any other beam steering apparatus that provides rapid and agile beam repointing can be used.

Figure 5A:
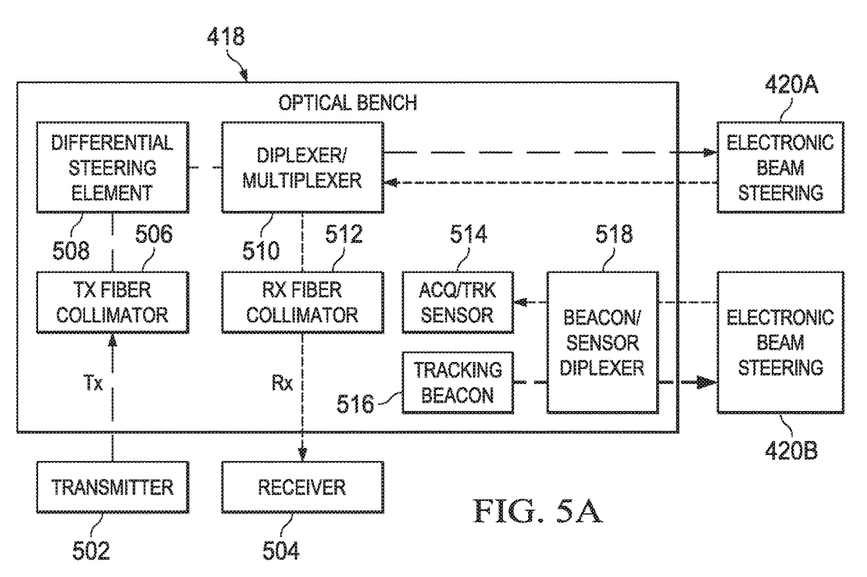
FIGS. 5A and 5B illustrate examples of an FSO optical bench in accordance with this disclosure.
Figure 5B:
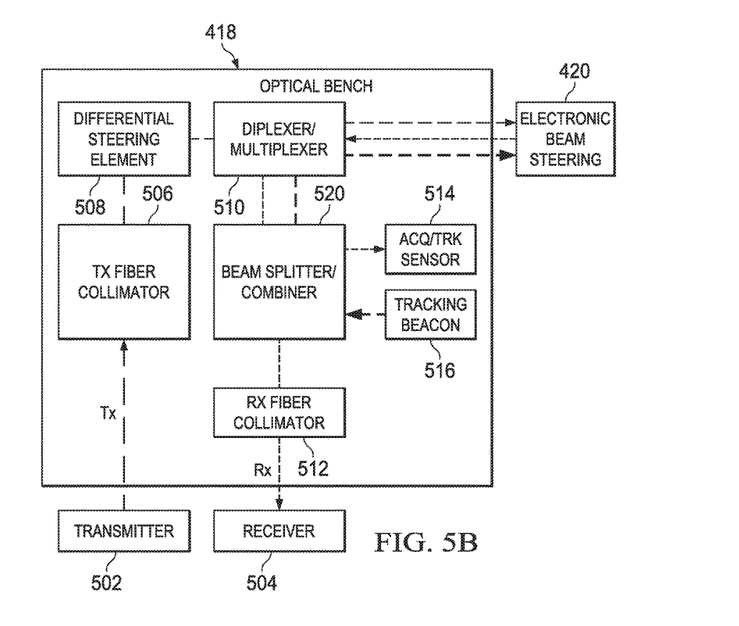

FIGS. 5A and 5B illustrate examples of an FSO optical bench 418 in accordance with this disclosure. As shown in FIGS. 5A and 5B, the optical bench 418 is optically coupled to one or more optical transmitters 502 and one or more optical receivers 504 in the optical transceiver 416. Multiple optical transmitters and receivers can be employed if wavelength division multiplexing (WDM) is used on a given traffic link. Each optical transmitter 502 generally operates to generate optical signals for outgoing communication, and each optical receiver 504 generally operates to convert incoming optical signals into another form (such as electrical signals) for further processing. Additional components could be used in the optical transceiver 416, such as an Erbium Doped Fiber Amplifier (EDFA) between an optical transmitter 502 and the optical bench 418 or an Optical Automatic Gain Control (OAGC) amplifier or low-noise optical amplifier between an optical receiver 504 and the optical bench 418.

FIG. 5A is an example of an optical bench 418 adapted to provide optical communications over a traffic link 112a that occur through a communication aperture, while the optical tracking links 112b are operated through separate acquisition/tracking apertures as described above. In this embodiment, an electronic beam steering assembly 420A is used only for the optical traffic links 112a, and an electronic beam steering assembly 420B is used only for the tracking links 112b. The electronic beam steering assemblies 420A-420B may be of the same or different designs depending on, for example, cost and performance requirements for a particular application.

In FIG. 5A, the optical bench 418 includes one or more transmit fiber collimators 506. The collimator 506 converts light from the optical transmitter 502 propagating in an optical fiber to a collimated beam of light in free space. In some embodiments, one or more differential steering elements 508 direct the outgoing collimated beams in the appropriate direction(s) to an optical diplexer/multiplexer 510. The purpose of the differential steering elements 508 is to compensate for offset in the pointing angles for transmission and reception. In other embodiments, the same function can be performed by placing the differential steering elements 508 in the receiver path. The differential steering elements 508 may include any type of precision steering components, such as fine steering mirrors or OPAs. The diplexer/multiplexer 510 separates the transmit and receive beams and, if WDM is used, separates (for receive) and combines (for transmit) the different wavelength channels. The diplexer/multiplexer 510 directs the outgoing beam(s) to the electronic beam steering assembly 420A.

One or more incoming beams are received at the optical diplexer/multiplexer 510 from the electronic steering assembly 420A. The diplexer/multiplexer 510 directs the incoming beam(s) to one or more receive fiber collimators 512. The collimators 512 focus the light in the incoming beam(s) into optical fibers, which conduct the beam(s) to the optical receiver(s) 504.

Each collimator 506, 512 includes any suitable structure for collimating light. The differential steering elements 508 include any suitable structure(s) for directing light in a desired direction. The diplexer/multiplexer 510 includes any suitable structure for providing different optical paths for different beams of light based on such properties as, for example, polarization, wavelength, and propagation direction. In this example, transmit beams are directed from the steering element 508 to the steering assembly 420A, while receive beams are directed from the steering assembly 420A to the collimators 512. In particular embodiments, the diplexer/multiplexer 510 includes a WDM multiplexer/demultiplexer.

In the embodiment illustrated in FIG. 5A, the optical bench 418 also includes an acquisition/tracking sensor 514, a tracking beacon source 516, and a beacon/sensor diplexer 518. Beacons can be directed to other nodes using the electronic beam steering assembly 420B. The acquisition/tracking sensor 514 is used to optically locate and establish a link 112b with another network node based on a beam being received from that node. This typically proceeds through a mutual process called spatial acquisition that transitions from approximate determination of direction through precise closed-loop tracking. Once tracking is established, it is maintained as a tracking link 112b. Optionally, a traffic link 112a can be added to the same node using the steering assembly 420A. The spatial acquisition and tracking functions can be performed by the same sensor 514 or by separate sensors 514. Examples of such sensors 514 include quadrant detectors, focal plane arrays, or other optical position or angle sensors.

The tracking beacon source 516 generates a beacon to provide an optical beam directed toward a distant node to enable the distant node to acquire and track the local node. The beacon source 516 may include any suitable beacon source, such as a laser, and it may generate a modulated signal to provide low-data-rate information over a link 112b to the distant node. An example of such information could include the status of the local node and its capability to carry additional traffic. The beacon/sensor diplexer 518 may be used to separate/combine the outgoing beacon from/with the incoming beacon in a manner similar to that of the optical diplexer/multiplexer 510. In other embodiments, the beacon/sensor diplexer 518 is not needed, and the acquisition/tracking sensor 514 and the tracking beacon 516 each have their own electronic beam steering assembly 420B.

In the embodiment shown in FIG. 5B, both the optical traffic link 112a and the tracking links 112b share the same electronic beam steering assembly 420. As noted above, in these embodiments, maintaining tracking links 112b with multiple nodes involves using the electronic beam steering assembly 420 to rapidly change the transmit/receive directions of the communication aperture between the node associated with the traffic link 112a and the node(s) with which the tracking link(s) 112b are to be maintained. While this involves time-sharing of the steering assembly 420 between communication and tracking functions, it reduces the number of assemblies used. The electronic beam steering assembly 420 can hop between the distant nodes rapidly enough to maintain accurate tracking information for the links 112b while still maintaining sufficient traffic carrying capacity for the link(s) 112a.

In the embodiment of FIG. 5B, the assemblies and functions for the traffic links 112a are almost the same as in FIG. 5A. One difference is the introduction of a beam splitter/combiner 520, which serves to couple the acquisition/tracking sensor 514 and tracking beacon 516 to the single aperture controlled by the steering assembly 420. The beam splitter/combiner 520 splits off a small fraction of the incoming beams (either from a traffic link 112a or a tracking link 112b) and directs it to the acquisition/tracking sensor 514, which performs in the same manner as in FIG. 5A. The beam splitter/combiner 520 also takes the output of the tracking beacon source 516 and inserts it into the beam path for transmission to distant nodes. The tracking beacon source 516 performs in a similar fashion to the embodiment of FIG. 5A and may be modulated to provide data.

In other embodiments (either of FIG. 5A or 5B), the beacon source 516 may be omitted from the node associated with the traffic link 112a. This is because the transmitted traffic beam can serve this purpose.

Still other embodiments involve a combination of FIGS. 5A and 5B in which the beam splitter/combiner 520 of FIG. 5B is added to the embodiment of FIG. 5A. In this configuration, the electronic beam steering assemblies 420B are only used to acquire nodes and support the tracking links 112b with nodes that are not being communicated with via a traffic link 112a. The terminal 400 uses the receive beam of a traffic link 112a (via the beam splitter/combiner) for tracking the node with which it is communicating, and its transmit traffic beam serves as a beacon. In this embodiment, a connection between the tracking beacon source 516 and the beam splitter/combiner 520 is not needed, which frees up one acquisition/tracking aperture to support an additional tracking link 112b.

Figure 6:
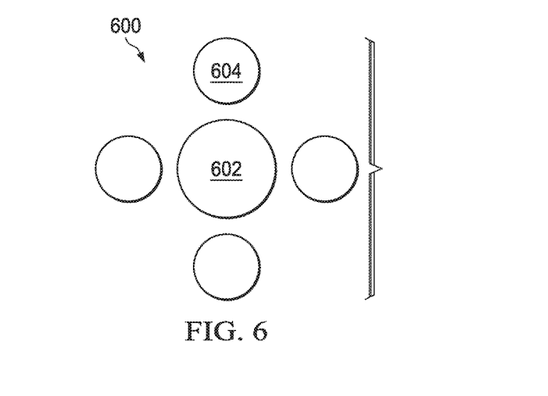
FIG. 6 illustrates an example arrangement of optical apertures in accordance with this disclosure.

FIG. 6 illustrates an example arrangement 600 of apertures associated with the terminal 400. As shown in FIG. 6, the arrangement 600 includes a communication aperture 602 and multiple acquisition/tracking apertures 604. The aperture 602 represents the aperture through which beams containing data for a traffic link 112a are sent and received. The apertures 604 represent the apertures through which beams containing beacons or other signals for acquisition/tracking links 112b are sent and received.

As shown here, the communication aperture 602 is larger than the acquisition/tracking apertures 604. This is a typical situation because high-data-rate traffic links 112a require a combination of larger apertures and higher transmission powers, while tracking links 112b can have smaller apertures and beacon transmission powers because they employ narrow-band electronics. The optimum sizes of the apertures 602-604 can vary depending on the particular application. Typical sizes for the aperture 604 could range from 1 cm to 5 cm, while typical sizes for each aperture 602 may range from 2 cm to 30 cm. U.S. Patent Publication No. 2012/0081621 (incorporated by reference) provides a very compact design for an electronic beam steering assembly that enables the apertures in FIG. 6 to be tightly packed.

Although FIGS. 4 through 6 illustrate example details of a node in an FSO network, various changes may be made to FIGS. 4 through 6. For example, the functional divisions shown in FIGS. 4 through 6 are for illustration only. Various components in each figure could be rearranged, combined, further subdivided, or omitted and additional components could be added according to particular needs. As a specific example, the electronic beam steering assembly 420 could incorporate beam expansion capabilities or be a part of the optical bench 418.

Although FIGS. 4 through 7 illustrate example details of a node in an FSO network, various changes may be made to FIGS. 4 through 7. For example, the functional divisions shown in FIGS. 4 through 7 are for illustration only. Various components in each figure could be rearranged, combined, further subdivided, or omitted and additional components could be added according to particular needs. As a specific example, the beam steering assembly 422 could be incorporated into and form a part of the beam expansion telescope 420 and/or a part of the optical bench 418.

Figure 7:
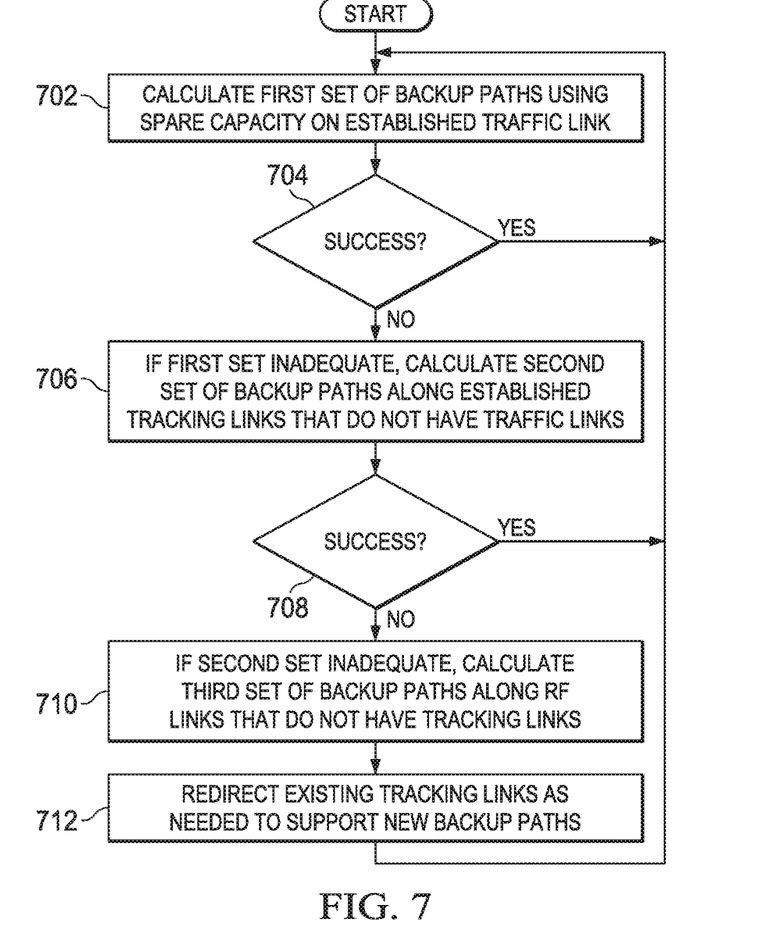
FIG. 7 illustrates an example method for computing backup paths to be used for protection switching in an FSO network in accordance with this disclosure.

FIG. 7 illustrates an example method 700 for computing backup paths to be used for protection switching in an FSO network in accordance with this disclosure. To help maintain network connectivity more effectively and reduce or minimize data loss, the method 700 could be continuously iterated to accommodate changes in network topology, traffic patterns, and link conditions. At least one iteration of the method 700 could be completed before protection switching can be performed.

A first set of backup paths is identified at step 702. This could include, for example, the network processor 408 in a node using the status of established traffic links 112a to identify spare capacity. The use of spare capacity over existing traffic links 112a may represent the fastest mechanism for rerouting traffic around a failed traffic link. Assuming this step successfully identifies adequate rerouting paths at step 704, the process can loop for another iteration. Success here can be measured in any suitable manner, such as determining whether the identified backup paths are adequate to fully protect the system with regard to traffic capacity and backup links that do not share the same risk as primary links.

If not, a second set of backup paths is identified at step 706. This could include, for example, the network processor 408 in a node using connections between nodes with tracking links 112b but not traffic links 112a. Redirecting a traffic link 112a onto a tracking link 112 could represent the second fastest mechanism to restore service. Assuming this successfully identifies adequate rerouting paths at step 708, the process can loop for another iteration.

If not, a third set of backup paths is identified at step 710. This could include, for example, the network processor 408 in a node using the RF links 112c to identify backup paths. Because this backup plan by itself might not result in rapid protection switching, it is followed by step 712 in which tracking links not associated with traffic links 112a are redirected so that backup paths are maintained by the tracking links 112b. The process can then loop for another iteration.

Although FIG. 7 illustrates one example of a method 700 for computing backup paths to be used for protection switching in an FSO network, various changes may be made to FIG. 7. For example, while shown as a series of steps, various steps in FIG. 7 could overlap, occur in parallel, occur in a different order, or occur multiple times within one process cycle. Also, various steps could be omitted or added according to particular needs and applications. As a particular example, any suitable technique or algorithm could be used to select which neighboring nodes are linked via the traffic links 112a and tracking links 112b for the backup paths and the optimum network topology.

Figure 8:
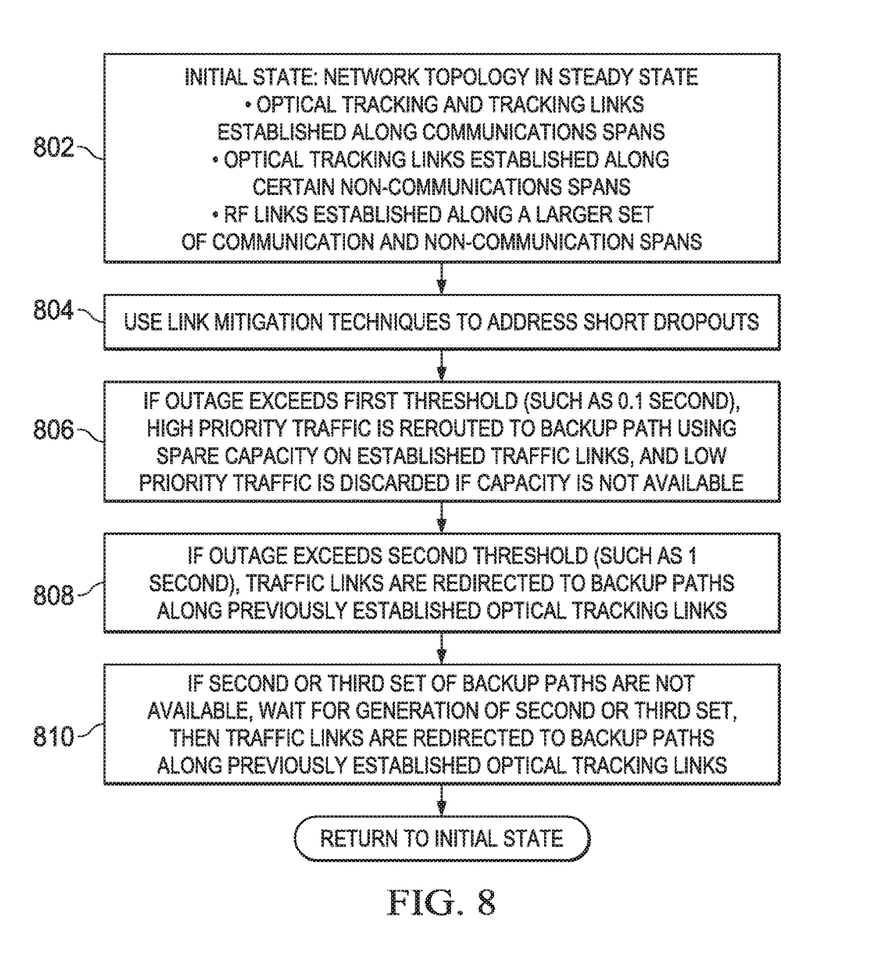
FIG. 8 illustrates an example method for protection switching in an FSO network in accordance with this disclosure.

FIG. 8 illustrates an example method 800 for protection switching in an FSO network in accordance with this disclosure. Note, however, that other mechanisms for protection switching can also be employed in an FSO system. The method 800 supports the rerouting of traffic, which may include the repositioning of traffic links 112a and tracking links 112b, in order to restore end-to-end network connectivity in cases of link blockage or node failure. For increased or maximum effectiveness, particularly with regard to speed, at least one iteration of the method 700 may be completed or at least partially completed before the method 800 is performed. While the method 800 can be easily visualized using the example network of FIGS. 2A and 2A, it applies generally to all networks subject to traffic interruption due to any impairment, such as weather-related link blockage and node malfunction.

The method 800 begins with the topology of a network in a steady state at step 802. Here, the optical traffic links 112a, optical tracking links 112b, and RF links 112c are established and operating between nodes of the network. The progression of the method 800 is then determined by the duration of any traffic interruptions.

Short dropouts (such as less than 0.1 seconds), which can occur on a relatively frequent basis, are handled through the use of link-based mitigation techniques (such as forward error correction, interleaving, adaptive optics, and optical automatic gain control) in step 804. Step 804 may not require network-based mitigation (although it could).

If an outage exceeds a first threshold (such as 0.1 seconds), the method 800 proceeds to step 806 in which spare capacity on existing optical traffic links is used to reroute traffic around impairments such as blocked links or disabled nodes. If the capacity available is not adequate to carry all of the blocked traffic, lower priority traffic could be discarded or queued for later transmission.

If the outage exceeds a second threshold (such as 1 second), the system proceeds to step 808, which causes optical traffic links to be redirected onto previously-established tracking links to establish backup traffic paths. Using electronic beam steering, the new traffic links 112a can be established rapidly (such as in less than 50 milliseconds). Step 808 assumes the successful completion of step 706 in the method 700, meaning step 808 uses the second set of backup paths computed during the method 800. If this is not the case, the method 800 proceeds to step 810 in which it waits for the generation of a second or third set of backup paths, at which point it uses the backup paths to cause the optical traffic links to be redirected onto previously-established tracking links.

After completing the method 800, the network is again in steady state. If the impairment that triggered the method 800 ends or the locations of the nodes change sufficiently, the network may proactively reconfigure itself to a more favorable topology based on the path computations of the method 700 and the procedures of the method 800. While FIG. 8 provides example thresholds (0.1 second and 1 second), optimum values can be set based on, for example, specifics of the network's implementation.

Although FIG. 8 illustrates one example of a method 800 for protection switching in an FSO network, various changes may be made to FIG. 8. For example, while shown as a series of steps, various steps in FIG. 8 could overlap, occur in parallel, occur in a different order, or occur multiple times. Also, various steps could be omitted or added according to particular needs and applications. As a particular example, FIG. 8 illustrates an approach where a system attempts to overcome a fault first using optical link mitigation, then by rerouting over existing traffic links, and then by forming new traffic links. This approach is not required, such as when a new traffic link is established after optical link mitigation fails without first attempting a reroute over existing traffic links or waiting for a tracking link to be established.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a network comprising multiple network nodes each configured for free-space optical communication;
wherein each network node comprises:
multiple apertures through which optical beams are transmitted and received over optical links, the multiple apertures including a communication aperture and at least one acquisition/tracking aperture, the optical links including (i) a traffic link that transports higher-rate traffic between nodes using the communication aperture and (ii) an acquisition/tracking link that transports lower-rate signals used to establish and maintain location knowledge of other nodes using the at least one acquisition/tracking aperture;
a network processor configured to determine one or more backup paths through the network using the at least one acquisition/tracking link where the at least one acquisition/tracking aperture is directed; and
a beam steering unit configured to redirect the communication aperture through which optical beams are transmitted and received to and from a specified one of the nodes over the traffic link onto the acquisition/tracking link to create a backup traffic link over at least one of the one or more backup paths indirectly to the specified one of the nodes.

2. The system of claim 1, wherein each network node is configured to transmit and receive optical beams to and from different remote network nodes over the traffic link and the acquisition/tracking link.

3. The system of claim 1, wherein each network node is configured to communicate over a larger number of acquisition/tracking links and a smaller number of traffic links.

4. The system of claim 1, wherein each network node is configured to redirect at least one of the network node's traffic link and acquisition/tracking link in response to a triggering event.

5. The system of claim 4, wherein the triggering event comprises blockage or interruption of the network node's traffic link.

6. The system of claim 4, wherein the triggering event in one of the network nodes comprises the network processor in that network node being unable to identify adequate backup paths using existing traffic links and existing acquisition/tracking links in the network.

7. The system of claim 1, wherein the beam steering unit in each network node is configured to redirect the optical beams from the network node's traffic link onto the network node's acquisition/tracking link within 50 milliseconds or less.

8. The system of claim 1, wherein the network processor in each network node is configured to determine the one or more backup paths for the network node using a distributed process that includes collaboration and information exchange amongst multiple ones of the network nodes.

9. The system of claim 1, wherein the network processor in each network node is configured to select a configuration of traffic links and acquisition/tracking links for the network node.

10. The system of claim 1, wherein the acquisition/tracking links are configured to carry control and status information between network nodes.

11. The system of claim 1, wherein each network node further comprises:
an electromagnetic communication system configured to use non-optical electromagnetic waves to communicate with other network nodes;
wherein the electromagnetic communication system of each network node is configured to transmit and receive information associated with the optical links and location and status information with other network nodes.

12. The system of claim 11, wherein the electromagnetic communication system in each network node is configured to communicate with other network nodes that are not in optical communication with the network node.

13. An apparatus comprising:
an optical communication terminal configured to engage in free-space optical communication with network nodes, the optical communication terminal comprising multiple apertures through which optical beams are transmitted and received over optical links, the multiple apertures including a communication aperture and at least one acquisition/tracking aperture, the optical links including (i) a traffic link that transports higher-rate traffic using the communication aperture and (ii) an acquisition/tracking link that transports lower-rate signals used to establish and maintain location knowledge of the network nodes using the at least one acquisition/tracking aperture;
a network processor configured to determine one or more backup paths through a network using the at least one acquisition/tracking link where the at least one acquisition/tracking aperture is directed; and
a beam steering unit configured to redirect the communication aperture through which optical beams are transmitted and received to and from a specified one of the nodes over the traffic link onto the acquisition/tracking link to create a backup traffic link over at least one of the one or more backup paths indirectly to the specified one of the nodes.

14. The apparatus of claim 13, wherein the apparatus is configured to redirect at least one of the traffic link and the acquisition/tracking link in response to a triggering event.

15. The apparatus of claim 13, wherein the beam steering unit is configured to redirect the optical beams from the traffic link onto the acquisition/tracking link within 50 milliseconds or less.

16. The apparatus of claim 13, further comprising:
an electromagnetic communication system configured to use non-optical electromagnetic waves to communicate with the network nodes;
wherein the electromagnetic communication system is configured to communicate with network nodes that are not in optical communication with the apparatus.

17. A method comprising:
communicating optically at a first network node with a second network node and exchanging data with the second network node by transmitting and receiving first optical beams over an optical traffic link, the first network node comprising multiple apertures through which optical beams are transmitted and received over optical links, the multiple apertures including a communication aperture, the optical traffic link transporting higher-rate traffic between nodes using the communication aperture;

optically tracking a third network node at the first network node by transmitting and receiving second optical beams over an optical acquisition/tracking link, the multiple apertures also including at least one acquisition/tracking aperture, the optical acquisition/tracking link transporting lower-rate signals used to establish and maintain location knowledge of other nodes using the at least one acquisition/tracking aperture;

determining one or more backup paths through a network using the at least one acquisition/tracking link where the at least one acquisition/tracking aperture is directed; and redirecting the communication aperture through which the first optical beams are transmitted and received to and from the second network node over the traffic link onto the acquisition/tracking link to create a backup traffic link over at least one of the one or more backup paths indirectly to the second network node.

18. The system of claim 1, wherein the apertures in each network node include an aperture configured to provide beacons to other network nodes.

19. The apparatus of claim 13, wherein the apertures include an aperture configured to provide beacons to the network nodes.

20. The apparatus of claim 14, wherein the triggering event comprises blockage or interruption of the network node's traffic link.

21. The apparatus of claim 14, wherein the triggering comprises the network processor being unable to identify adequate backup paths using existing traffic links and existing acquisition/tracking links in the network.

* * * * *

UNITED STATES PATENT AND TRADEMARK OFFICE
CERTIFICATE OF CORRECTION

PATENT NO.        : 9,680,565 B2
APPLICATION NO.   : 13/841307
DATED             : June 13, 2017
INVENTOR(S)       : William J. Miniscalco et al.

It is certified that error appears in the above-identified patent and that said Letters Patent is hereby corrected as shown below:

In the Claims

In Claim 21, Column 17, Line 28, please insert --event-- after "triggering".

Signed and Sealed this
Tenth Day of July, 2018

Andrei Iancu
*Director of the United States Patent and Trademark Office*